No. 822,670.

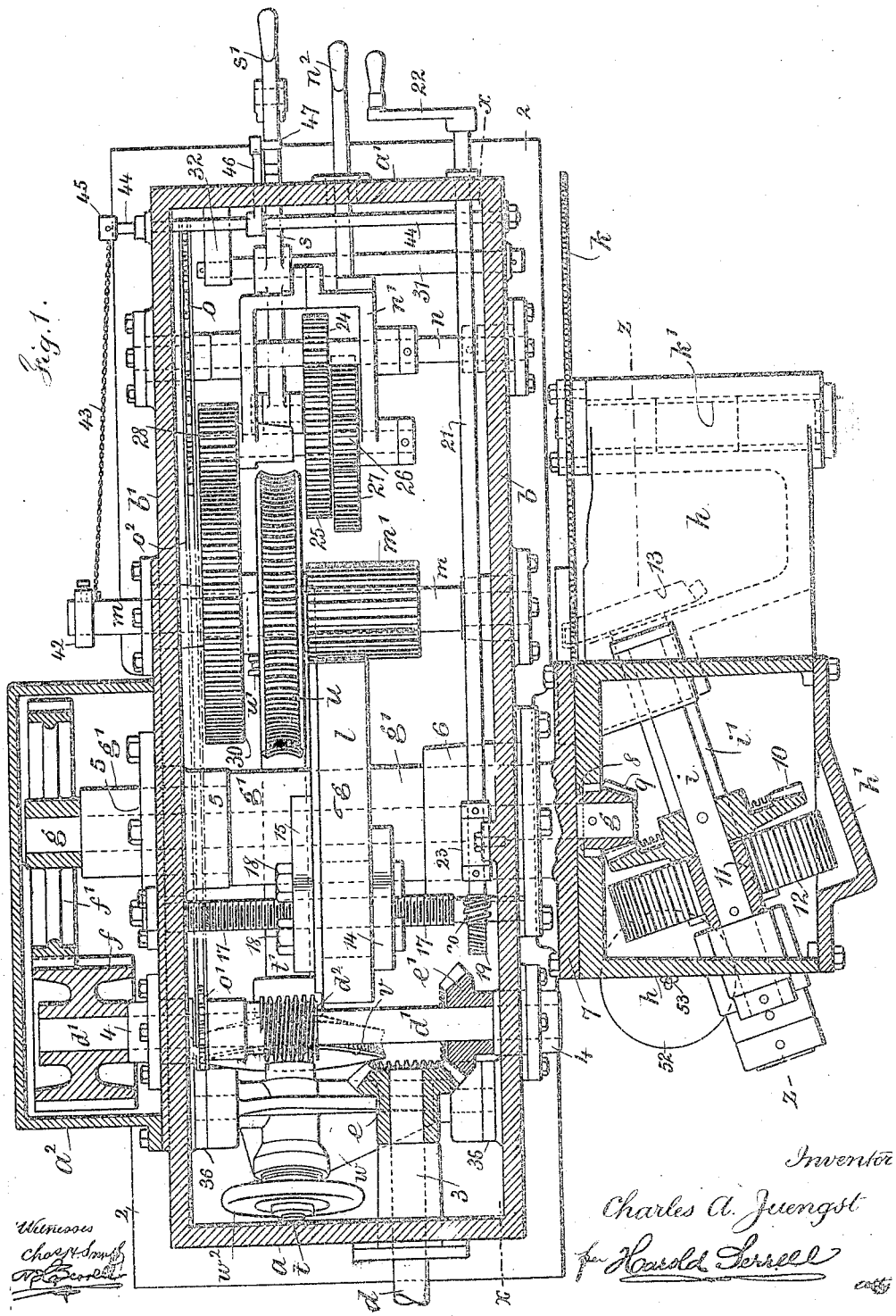

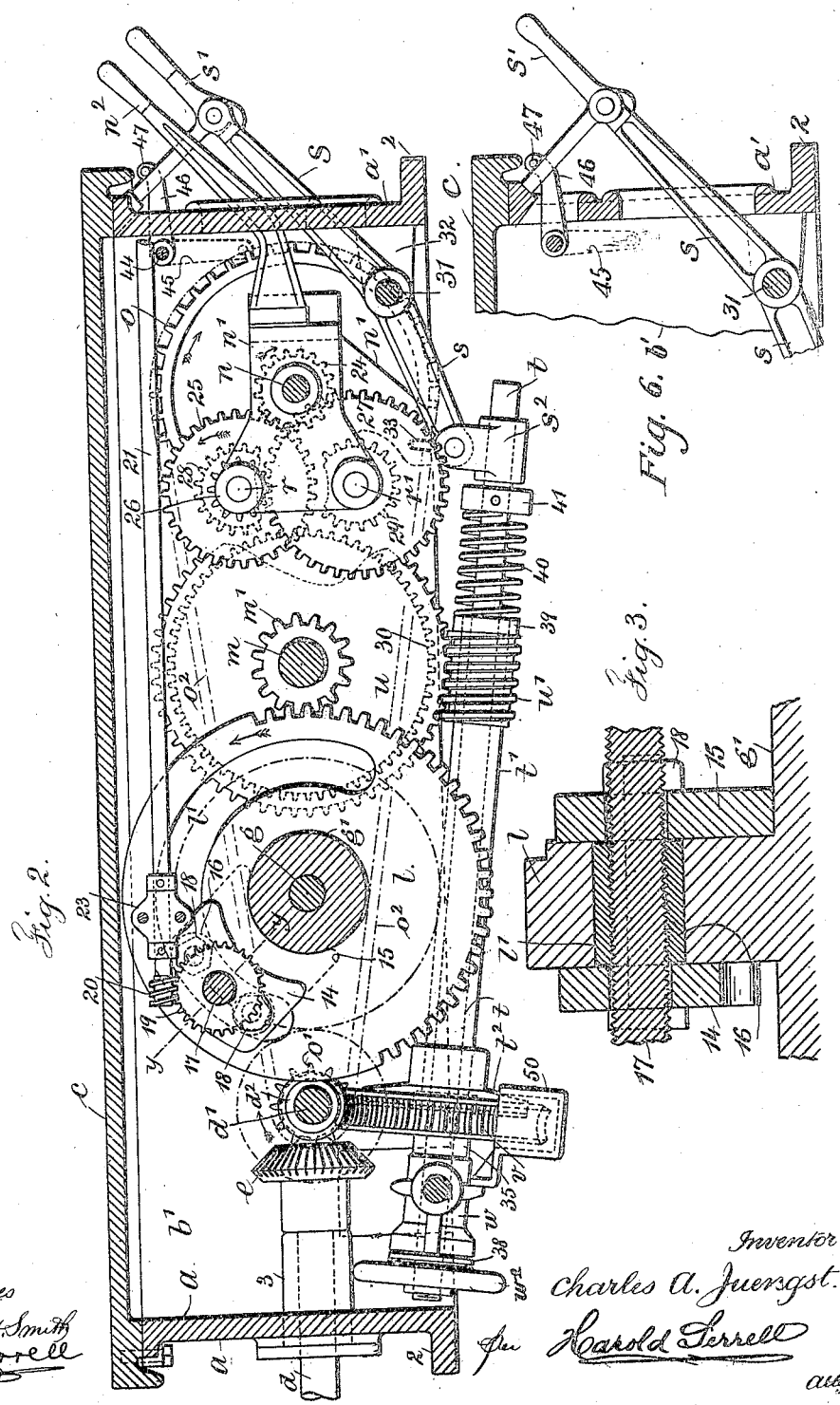

PATENTED JUNE 5, 1906.

C. A. JUENGST.
METAL SAWING MACHINE.
APPLICATION FILED FEB. 23, 1904.

3 SHEETS—SHEET 3.

Witnesses

Inventor
Charles A. Juengst.
per Harold Serrell
atty

United States Patent Office.

CHARLES A. JUENGST, OF CROTON FALLS, NEW YORK, ASSIGNOR TO HIGLEY MACHINE COMPANY, OF CROTON FALLS, NEW YORK, A CORPORATION OF NEW YORK.

METAL-SAWING MACHINE.

No. 822,670.     Specification of Letters Patent.     Patented June 5, 1906.

Application filed February 23, 1904. Serial No. 194,753.

*To all whom it may concern:*

Be it known that I, CHARLES A. JUENGST, a citizen of the United States, residing at Croton Falls, in the county of Westchester and State of New York, have invented an Improvement in Metal-Sawing Machines, of which the following is a specification.

My invention relates to a metal-sawing machine especially adapted for use with large and heavy work; and the object of my invention is to combine in one machine the necessary devices for both actuating and controlling the movements of the saw that it may be efficiently and as far as possible automatically operated by even a single attendant, exclusive of those engaged on the material operated upon. In my improvement I employ a group or series of devices for revolving the saw, a movable carrier for a portion of said devices, and a tubular swinging support for the carrier, devices adapted for moving the saw-group carrier, and tubular support longitudinally of a main shaft to accommodate the same to the position of the work, devices for moving the saw to and from the work, devices for holding the saw in a semi-elevated position, devices for progressively feeding the saw during work, devices for automatically disengaging the feed at the end of the cut, and devices yielding for the disconnection of the feeding devices under excess of load. These several devices or groups of devices coact, assist, and complete or amplify the operations of functions of each other to the production of a most complete and fully-operative device by which large beams, posts, or other forms of metal can be sawed cold.

Figure 4:
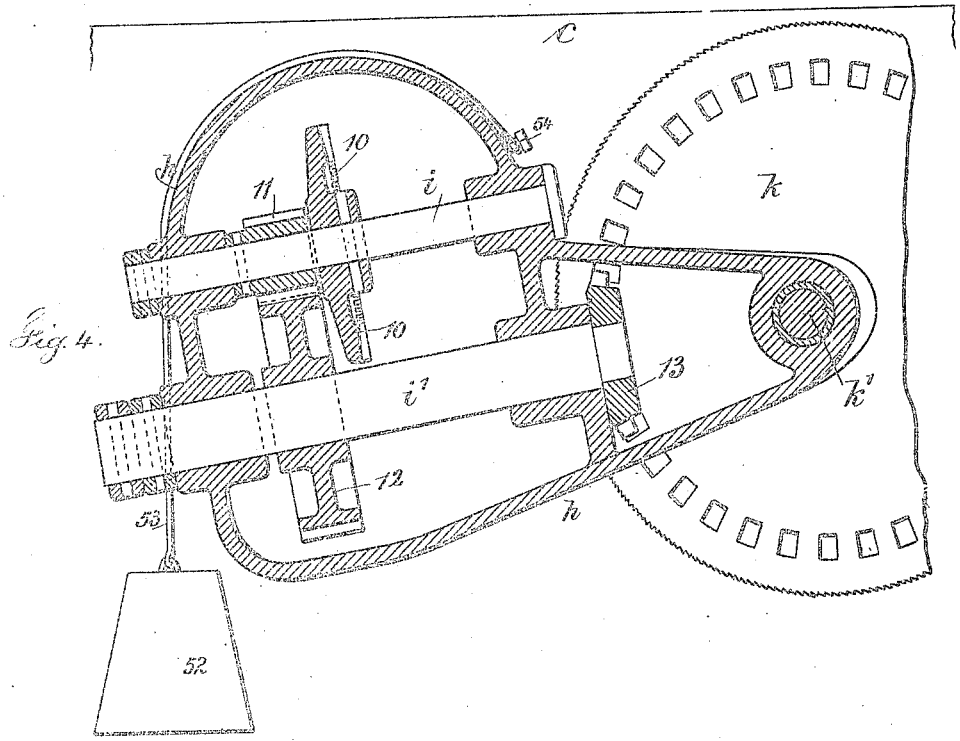
Figure 5:
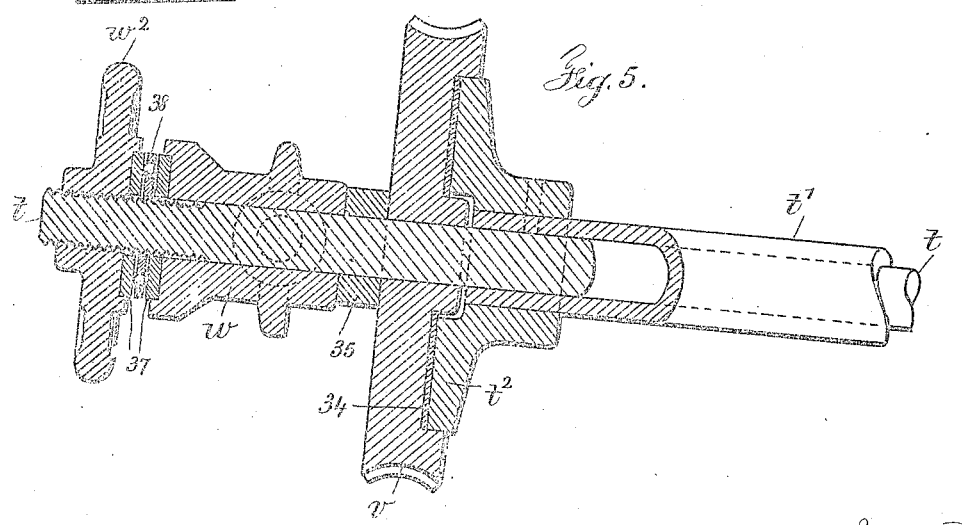

In the drawings, Figure 1 is a general plan view and partial section representing the devices of my improvement. Fig. 2 is a vertical section and partial elevation on about the line $x$ $x$ of Fig. 1 as if the saw and its frame and coacting devices and one side of the case were removed. Fig. 3 is a cross-section at the line $y$ $y$ of Fig. 2, the parts being shown of exaggerated size for clearness. Fig. 4 is a vertical longitudinal section through the group or series of saw-operating devices and the carrier at about the line $z$ $z$, Fig. 1, the parts in Fig. 4 being shown of exaggerated size. Fig. 5 is a longitudinal section and partial elevation of a portion of the devices yielding for the disconnection of the feeding devices under excess of load, the parts in Fig. 5 also being shown of exaggerated size; and Fig. 6 is a vertical section through the right-hand end of the case, showing the slot and the parts that move therein.

The case surrounds and supports the larger proportion of the devices hereinbefore referred to. The same is open at the lower portion or, in other words, is bottomless. It is composed of ends $a$ $a'$ and sides $b$ $b'$, which parts are preferably made with a flange or base 2, adapted to rest upon and be secured to a suitable support, preferably of masonry. The top or cover $c$ is stiffened by a downward flange or edge, which rests upon the ends and sides and is preferably bolted thereto. The end $a$ is provided with a bearing 3 for the shaft $d$, by which the initial power is applied to the series of devices.

A shaft $d'$ extends across through the sides of the case just forward of the inner end of the shaft $d$ in suitable bearings 4 4. On the inner end of the shaft $d$ and on one end of the shaft $d'$ are meshing bevel-gears $e$ $e'$, by which the movement and the power are communicated from the shaft $d$ to the shaft $d'$. A housing $a^2$ is provided and secured to the side $b'$ of the case, and into this housing one end of the shaft $d'$ projects beyond a bearing 4, and keyed to this end of the shaft $d'$ is a gear $f$.

The sides $b$ $b'$ of the case are provided with bearings 5 6, and through these bearings passes a sleeve $g'$, that is offset—that is to say, the sleeve $g'$ passes completely through the bearing 6 and is offset against the inner face of the bearing 5, a reduced portion of the sleeve $g'$ passing through the bearing 5. Within the sleeve is a shaft $g$, passing completely through the same. On one end of the shaft $g$ where it projects into the housing $a^2$ beyond the bearing 5 a gear $f'$ is keyed to the shaft. The gear $f$ is a broad-faced gear, while the gear $f'$ is a narrow-faced gear, the gear $f$ by its extra width providing for a movement in the meshing relation of the gear $f'$ with reference to the gear $f$.

The end of the sleeve $g'$ where it projects through and beyond the bearings 6 is provided with a flange 7 of appreciable area, to which is secured a carrier *h* for the gears and saw, the side of which opposite to its connection with the flange 7 is provided with a cover *h'*, having a swelled portion for the gear, which cover is securely fastened to the carrier by bolts. Within and across this carrier in suitable bearings (see Figs. 1 and 4) there are shafts *i i'*. The forward end of the shaft *g* projects beyond the flange 7 into the carrier *h*, and the flange 7 is provided with a collar 8, surrounding the shaft *g*, and which collar extends forward of the surface of the flange 7 into a recess of the carrier *h* and acts to center the carrier with reference to the shaft *g*. On this forward end of the shaft *g* there is a bevel-pinion 9, which meshes with a bevel-gear 10 on the shaft *i*, and on this shaft *i*, back of the bevel-gear 10, is a pinion 11, which meshes with a gear 12 on the shaft *i'*. The saw *k* is connected to an arbor *k'* in bearings in the right-hand portion of the carrier *h*, which bearings may be of any suitable character. The saw, as is well known in this art, is provided with a series of circularly-arranged perforations nearer to the periphery than to the arbor, and these are engaged by the teeth of a sprocket 13 on the end of the shaft *i'*, the power being communicated to the saw by the devices just described.

The operative devices hereinbefore described comprise the group or series of devices for revolving the saw, the movable carrier for a portion of said devices, and a tubular swinging support for the carrier, for it will be apparent that the saw, the carrier *h*, and the gears within the same, together with the flange 7, the sleeve *g'*, the shaft *g*, and the gear *f'*, may be moved longitudinally of the shaft and sleeve in the bearings 5 6 of the case to the extent of the width of the gear *f* or possibilities of movement provided in the housing *a²*.

The devices adapted for moving the saw group, the carrier, and tubular support longitudinally of the shaft *g* to accommodate the said devices to the position of the work comprise the following: A member *l*—that is, a wheel or half-gear—is mounted upon the sleeve *g'*—that is to say, the device *l* is in the form of a wheel with teeth cut upon one-half of the circumference thereof and with a half-segment slot *l'* made therein, (see especially Fig. 2,) which not only shows the structure, but shows the relation of the half-segment slot to the half-gear or half-circumference of teeth. At opposite sides of the half-gear *l* there are face-plates 14 15. The face-plate 14 is short; but the face-plate 15 extends to and has a curved lower edge resting upon the curved surface of the sleeve *g'*. There is a nut 16 in the slot *l'* which in length agrees with the width of the half-gear *l*. This is perforated and interiorly threaded for the threaded arbor 17. This arbor 17 extends across the case and is provided with suitable bearings in the sides *b b'*. The two face-plates 14 and 15 are held against the opposite sides of the half-gear *l* by nuts 18, which pass through the nut 16 and into and through the face-plates, the said face-plates forming guides with relation to the member or half-gear *l* for the nut 16, so as to keep said nut 16 at all times in the half-segment slot *l'*.

On one end of the threaded arbor 17 is a worm-wheel 19, and I provide a shaft 21, running lengthwise of the case and out through the end *a'* and terminating in a handle 22. At the inner end of the shaft 21 there is a suitable bearing 23, secured to the side *b* of the case, and on the free end of the shaft 21 is a worm 20, which meshes with the worm-wheel 19. The shaft 21 by its handle 22 is turned by hand. This rotates the worm 20, turning the worm-wheel 19 and the arbor 17. This movement of the arbor 17 causes the same, acting in the confined nut 16, to bear with force upon the half-gear *l* and to move the same, the sleeve *g'*, and the shaft *g* lengthwise, consequently moving the carrier, as well as the tubular swinging support or sleeve *g'* and the saw group supported by and connected to the carrier. This movement is solely longitudinal or axially of the shaft *g*, so as to bring the saw with reference to the case to the right place in relation to the work to make the cut.

It now remains to move the saw up to or from the work, and the devices for thus moving the saw comprise the following: The shaft *m* extends across the case between the sides *b b'* in suitable bearings, one end of said shaft projecting beyond the casing *b'* for a purpose hereinafter described. Upon the shaft *m* is a long toothed pinion *m'*, which pinion meshes with the teeth of the half-gear *l*. A shaft *n* also extends across the casing and is mounted in suitable bearings in the sides *b b'* distant from the shaft *m*. A swinging U-shaped frame *n'* is connected to and supported by the shaft *n*, said frame being provided with a handle *n²*, which projects through an opening in the end *a'* of the case, and by means of which handle the said frame *n'* and the parts carried thereby are rocked upon the shaft *n*. Upon this shaft *n* there is a sprocket *o* adjacent to the inner surface of the side *b'* of the case, and on the shaft *d'*, hereinbefore described, there is a sprocket *o'*, a chain *o²* extending between and around these sprockets, so as to communicate the power and the movement of the shaft *d'* to the shaft *n*. The swinging U-shaped frame *n'* carries two arbors *r r'*, and a train of gears is connected to the shaft *n* and the arbors *r r'*—that is, a pinion 24 is mounted on the shaft *n*. This meshes with a gear 25, mounted on the arbor *r*. On this arbor *r* is a pinion 26, meshing with a gear 27 on the arbor *r'*, whereby not only the rotation of the shaft *n* is transmitted to these gears, but a reduced movement by the gearing-down of the train. There is also a gear 28 on the arbor $r$. On the arbor $r'$ and below the gear 28 is a gear 29 of corresponding dimensions. On the shaft $m$ is a gear 30. The gears 28 and 29 are independent of one another.

In the position of the parts Fig. 2 the rotary movement of the shaft $d'$ is continuously communicated, by means of the sprockets $o$ $o'$ and chain $o^2$, to the shaft $n$ and from the shaft $n$ to the aforesaid train of gears. In the position of the parts Figs. 1 and 2 the train of gears are presumed to be running free and not to be communicating their movement to any other device. If now the handle $n^2$ is grasped and raised, the frame $n'$ is swung on the shaft $n$ so that the gear 28 is brought into mesh with the gear 30. In this position and following out the respective rotary movements of the parts a rotary movement in the direction of the arrow is imparted to the gear 30 and the shaft $m$, turning the half-gear $l$ in the direction of the arrow thereon, and so turning the sleeve $g'$ upon the shaft $g$ and swinging the saw group in an upward direction, and thus bringing the saw against the work placed on the top or cover $c$ of the case. A downward movement imparted to the handle $n^2$ rocks the U-shaped frame on the shaft $n$ and brings the gear 29 into mesh with the gear 30. This reverses the movement of the parts and turns the shaft $m'$ and the half-gear in the opposite direction and lowers the saw group away from the work.

The devices for holding the saw in a semi-elevated position—for instance, after the saw has been brought up to the work and before the progressive feeding of the saw in performing the work is started—comprise the following: A shaft 31 extends part way across between the sides of the case near the end $a'$, one end of the shaft having a bearing in the side $b$ and the other end in a bracket 32, secured to the end $a'$. This shaft carries a rocker-arm $s$, on the upper end of which is a bell-crank handle $s'$. At the lower end of the rocker-arm $s$ there is a bearing sleeve and head $s^2$, that are pivotally connected to the lower end of the rocker-arm, the said sleeve supporting one end of a shaft $t$ and carrying in its upper face a pin 33, which is adapted to enter a hole in the lower part of the swinging U-shaped frame $n'$. Therefore when the parts are in the position Fig. 2, with the pin 33 engaging the swinging frame $n'$ and a part of the bell-crank handle $s'$ coming against the end $a'$ of the case, the shaft $t$ is held in an elevated position. The gears 28 and 29 are kept away from contact with the gear 30 and instead of the connection of these parts a large worm-wheel $u$ on the shaft $m$ is in engagement with the worm $u'$ on the shaft $t$ and the saw group and carrier cannot descend by gravity, because they are held by the meshing of the teeth of the half-gear $l$, the pinion $m'$, and the worm-wheel $u$ and worm $u'$, backed up by the connection of the shaft $t$ to the power-shaft hereinafter described.

While the worm $u'$ is nominally upon the shaft $t$, it is actually upon and secured to the sleeve $t'$, which surrounds a portion of the shaft $t$. Upon the end of the sleeve $t'$ opposite to the end to which the worm $u'$ is secured there is a friction-disk $t^2$, having a face at right angles to the line of the shaft $t$, which is preferably surfaced with a strip or piece of leather 34 or equivalent material. A worm-wheel $v$ is loose on the shaft $t$, and one face thereof is provided with a recess to receive the friction-disk $t^2$. Next to the worm-wheel $v$ on the shaft $t$ is a collar 35, and while the shaft $t$ and the parts associated therewith are carried at one end or supported by the pivoted rocker-arm $s$ and the bearing sleeve and head $s^2$ the said devices at the opposite end are supported by a frame and sleeve $w$, having at its respective ends trunnions in bearings 36 upon the sides $b$ $b'$ of the case, which trunnion ends and bearings make it possible for the shaft $t$ and the parts associated therewith to swing on said trunnions and bearings. The shaft $t$ passes through the sleeve of the frame $w$. One end of the sleeve abuts against the collar 35, and the other end of said sleeve comes up against an antifriction ball-bearing device.

Upon the end of the shaft $t$ which is exteriorly threaded is a hand-wheel $w^2$, and I provide ball-race disks 37, one of which is received in a recess of the hand-wheel $w^2$ and the other in a recess in the juxtaposed end of the hub of the frame $w$, and between these ball-race disks is a ball-carrier and balls 38, providing an antifriction-bearing at this end of the shaft between the fixed frame and hub $w$ and the hand-wheel $w^2$, which turns with the shaft. The worm-wheel $v$ meshes with a worm $d^2$ on the shaft $d'$, hereinbefore described. I provide a collar 39 upon the end of the sleeve $t'$ adjacent to the worm $u'$ and a collar 41 upon and pinned to the shaft $t'$ near the bearing-sleeve $s^2$, and between these collars around the shaft $t$ is a helical spring 40.

The shaft $m$ is prolongated beyond its bearing in the side $b'$ of the case, and upon the same is a collar 42, to which one end of a chain 43 is secured. This collar 42 is loose upon the shaft, but by means of a set-screw may be fastened in any desired position. I provide a shaft 44, extending across the case in bearings in the sides $b$ $b'$ and near the end $a'$ of the case. On the end of the shaft outside of the side $b'$ there is a crank-arm 45, to which the other end of the chain 43 is secured, and within the case there is another crank-arm 46, secured to the shaft and which projects through the end $a'$ of the case, and the same at its free end is provided with a pin 47, which pin 47 extends over the portion of the bell-crank handle $s'$ which rests against the end of the case.

The devices for progressively feeding the saw during its work and after the same has been raised, as hereinbefore described, comprise the shaft $d$, the bevel-gears $e$ $e'$, the shaft $d'$, the worm $d^2$ on that shaft, the worm-wheel $v$, the friction-disk $t^2$ and its sleeve $t'$, the worm $u'$ and the worm-wheel $u$, the shaft $m$, its pinion $m'$, and the half-gear $l$, which from the position of the parts Fig. 2 is slowly turned in the direction of the arrow to gradually raise the saw $k$ and the carrier $h$ as the cutting of the saw in the work progresses.

By reference to the collar 42 and the chain 43 it will be apparent that with this rotation of the shaft $m$ the slack of the chain 43 will be wound upon the shaft $m$ during this movement, and the devices for automatically disengaging the saw at the end of the cut comprise this shaft $m$, the collar 42, the chain 43, the shaft 44, and the crank-arms 45, 46, and pin 47, because the collar 42 and the slack-chain 43 are to be so set with reference to the extent of the cut and size of the work that this chain will be wound up and will toward the end of the cut pull upon the crank-arm 45 and swing the shaft 44 and the crank-arm 46 and in so doing and by virtue of the pin 47 move the portion of the bell-crank handle $s'$ that bears upon the end of the case downward and disengage the same from such bearing and in the movement downward bring this portion of the bell-crank handle $s'$ into line with a slot formed in the end $a'$ of the case, and which slot receives the same. It will thus be seen that this movement trips the bell-crank handle $s'$ and frees the rocker-arm $s$. Consequently the weight of the shaft $t$ and the parts associated therewith will cause the same to descend and in so doing to separate the worm $u'$ and the worm-wheel $u$ and stop the rotation of the saw and also to draw the pin 33 out of the aperture provided therefor in the lower part of the swinging frame $n'$, releasing said frame $n'$ and the parts associated therewith, so that the attendant may grasp the handle $n^2$ and depress the same, so as to bring the gear 29 into mesh with the gear 30 on the shaft $m$, and in so doing to reverse the movement and return the half-gear $l$ to the initial position and in so doing turn back the sleeve $g'$ and carrier $h$ and lower the saw away from the work.

The office performed by the hand-wheel $w^2$ is twofold: first, to permit a longitudinal movement of the shaft $t$ when the hand-wheel is unscrewed, which movement is produced by an expansion of the spring 40, so as to permit the separation of the meeting faces of the friction-disk $t^2$ and the worm-wheel $v$ to permit the worm-wheel $v$ to turn freely upon the shaft by the rotation of the shaft $d'$ and worm $d^2$, and also when the said friction-surfaces are in contact and the sleeve $t$ in rotation to provide the initial force that may be required to progressively advance the saw into the material with the cutting of the same, because it must be remembered that some materials are harder than others and a friction that would answer between the disk $t^2$ and the worm-wheel $v$ for some materials would be entirely inadequate for others.

50 represents a trough or receptacle supported by the frame $w$ and inclosing the lower portion of the worm-wheel $v$ and adapted to contain oil for freely lubricating the teeth of said worm-wheel and also therefrom the spiral rib of the worm $d^2$.

To provide for a contingency such as might arise where the saw in its operations meets an extra thickness of metal or a portion of the metal unduly hard and the effort required to be put forth by the devices is increased to such an extent that at the speed of progression damage is liable to accrue to the instrumentalities employed, provision has been made for a yielding action under such excessive load to the extent that this excessive load will retard the movement of the saw, consequently creating a back pressure, which back pressure will be effective through the devices provided for progressively feeding the saw during the work—namely, the carrier $h$, the sleeve $g'$, the half-gear $l$, pinion $m'$, shaft $m$, and worm $u'$—which action will have the effect of moving the worm $u'$ longitudinally and compressing the spring 40 and with this movement separating the friction-surfaces of the disk $t^2$ and the worm-wheel $v$, momentarily stopping the feed and arresting the movement of the saw through the hard material, after which the parts assume their initial position and the feed progresses as before.

I have shown, especially in Fig. 4, and prefer to employ a counter balance or weight 52 at the opposite side of the carrier $h$ from that in which the saw $k$ is mounted. This weight is at the free end of a rope 53, which extends up and over the curved upper surface of said carrier $h$ and is fastened thereto by a bolt 54 or equivalent device. The object of this counterbalance is to cause the parts to the left hand of a vertical plane through the center of the shaft $g$ to substantially equal in actual weight the weight of the parts, including the saw, to the right hand of said vertical plane, so that when said parts are swung by turning the sleeve $g'$ only a minimum effort is required to be put forth prior to the work of the saw, and even then only sufficient in addition to effect the progressive cut of the saw in the work.

The features of my present invention embraced in this application are closely related, especially on generic lines, to the devices shown and described in an application for Letters Patent filed by me March 27, 1903, Serial No. 149,867, and which application the present application is a substitute for.

I claim as my invention—

1. In a metal-sawing machine, the combination with the rotary saw, of devices for imparting cutting movement thereto, devices for supporting the saw and to which a swinging movement may be given, and means for imparting an axial longitudinal movement to said devices, means for moving the saw to and from the work, and devices for progressively feeding the saw during the period of work.

2. In a metal-sawing machine, the combination with the rotary saw, of devices for imparting cutting movement thereto, devices for supporting the saw and to which a swinging movement may be given, means for moving the latter devices to bring the saw to and from the work, of such character as when released will permit the saw and frame to return to their initial position, devices for progressively feeding the saw during the work, and devices for holding the saw in a semi-elevated position between the action of the devices for raising the same and the devices for feeding the saw during the period of work.

3. In a metal-sawing machine and in combination, a saw and saw-carriage, feed-gearing for moving the carriage upward during the work, and a trip arranged to be controlled by an element of the feed-gearing to disconnect the gearing and permit the gravity return of the carriage and saw when the cut is finished.

4. In a metal-sawing machine, the combination with a saw and a carrier upon which the saw is mounted, of a sleeve movably mounted in bearings in the frame of the machine and to which the carrier is secured, a shaft passing through the sleeve, devices associated with the shaft and by which motion and power are communicated to the shaft, and devices interposed between the said shaft and the saw by which motion and power are transmitted from the shaft to the saw.

5. In a metal-sawing machine, the combination with a saw and a carrier upon which the saw is mounted, of a sleeve in bearings in the frame of the machine and to which the carrier is secured, a shaft passing through the sleeve, devices associated with the shaft and by which motion and power are communicated to the shaft, devices interposed between the said shaft and the saw by which motion and power are transmitted from the shaft to the saw, and devices for moving the sleeve and the shaft longitudinally so as to bring the saw in the right position relatively to the work.

6. In a metal-sawing machine, the combination with a saw and a carrier upon which the saw is mounted, of a sleeve in bearings in the frame of the machine and to which the carrier is secured with the saw at one side of the carrier-pivot, a shaft passing through the sleeve, devices associated with the shaft and by which motion and power are communicated to the shaft, devices interposed between the said shaft and the saw by which motion and power are transmitted from the shaft to the saw, devices for moving the sleeve and the shaft longitudinally, so as to bring the saw in the right position relatively to the work, and devices associated with the aforesaid devices for turning the sleeve and raising the saw and its carrier to the work or lowering the same to an initial position.

7. In a metal-sawing machine, the combination with a saw and a carrier upon which the saw is mounted, of a sleeve in bearings in the frame of the machine and to which the carrier is secured with the saw at one side of the carrier-pivot, a shaft passing through the sleeve, devices associated with the shaft and by which motion and power are communicated to the shaft, devices interposed between the said shaft and the saw by which motion and power are transmitted from the shaft to the saw, devices for moving the sleeve and the shaft longitudinally so as to bring the saw in the right position relatively to the work, and a group of devices coacting with the aforesaid devices during the running of the saw for progressively feeding the saw during the work.

8. In a metal-sawing machine, the combination with the rotary saw, devices for supporting the saw and to which a swinging movement may be given, of a swinging shaft, a gear on said shaft and other gears meshing therewith and extending to the swinging devices supporting the saw, and together forming separable devices for progressively feeding the saw during the period of work, means connected to and associated with part of the latter devices and regulatable in proportion to the predetermined length of the cut to be performed by the saw, and which means act at the end of the cut upon the other part of the latter devices to effect their separation and permit the saw to return to an initial position.

9. In a metal-sawing machine, the combination with the case or frame and the bearings 5, 6 having apertures of a different diameter, of an offset sleeve $g'$ passing through the bearings and at its offset portion abutting against the bearing having the narrower aperture, a flange formed with the sleeve at one end, a carrier $h$ secured to the sleeve at said flange, a saw and an arbor therefor mounted in the end of said carrier distant from said flange whereby the saw and its carrier are pivotally mounted, means for swinging said devices and other means for imparting a longitudinal movement thereto which coact with the aforesaid means.

10. In a metal-sawing machine, the combination with the case or frame and the bearings 5, 6 having apertures of a different diameter, of an offset sleeve $g'$ passing through the bearings and at its offset portion abutting against the bearing having the narrower aperture, a flange formed with the sleeve at one end, a carrier $h$ secured to the sleeve at said flange, a saw and an arbor therefor mounted in the end of said carrier distant from said flange whereby the saw and its carrier are pivotally mounted, a shaft passing through said longitudinally-movable sleeve, a gear on one end of the shaft and a bevel-pinion on the other end of said shaft, a long-faced gear with which the aforesaid gear is in mesh providing for the longitudinal movement of the sleeve, devices for imparting power and rotation to the long-faced gear, and devices located between the bevel-pinion and the saw for transmitting said rotation and power to the saw.

11. In a metal-sawing machine, the combination with the case or frame and the bearing 5, 6 having apertures of a different diameter, of an offset sleeve $g'$ passing through the bearings and at its offset portion abutting against the bearing having the narrower aperture, a flange formed with the sleeve at one end, a carrier $h$ secured to the sleeve at said flange, a saw and an arbor therefor mounted in the end of said carrier distant from said flange whereby the saw and its carrier are pivotally mounted, shafts $i, i'$ in bearings in the saw-carrier, gears connecting said shafts, a sprocket on one of said shafts, the teeth of which engage driving-apertures in the saw, a bevel-gear on the other of said shafts, a shaft $g$ running lengthwise through the longitudinally-movable sleeve, a bevel-pinion on one end of said shaft meshing with said bevel-gear, and means connecting with the opposite end of said shaft $g$ for communicating rotation and power thereto.

12. In a metal-sawing machine, the combination with the case or frame and the bearings 5, 6 having apertures of a different diameter, of an offset sleeve $g'$ passing through the bearings and at its offset portion abutting against the bearing having the narrower aperture, a flange formed with the sleeve at one end, a carrier $h$ secured to the sleeve at said flange, a saw and an arbor therefor mounted in the end of said carrier distant from its flange whereby the saw and its carrier are pivotally mounted, shafts $i, i'$ in bearings in the saw-carrier, gears connecting said shafts, a sprocket on one of said shafts, the teeth of which engage driving-apertures in the saw, a bevel-gear on the other of said shafts, a shaft $g$ running lengthwise through the longitudinally-movable sleeve, a bevel-pinion on one end of said shaft meshing with said bevel-gear, shafts $d, d'$ at right angles to one another in suitable bearings in the case of the machine, bevel-pinions connecting said shafts, a long-faced gear on the end of the shaft $d'$ and a short-faced gear on the adjacent end of the shaft $g$ for communicating power and rotation to the shaft $g$ and the devices intermediate thereof and the saw and for providing for the relation of the said gears during a longitudinal movement of the said shaft $g$ and sleeve $g'$.

13. In a metal-sawing machine, the combination with the saw, a carrier upon which the saw is revolubly mounted, a sleeve to which the carrier is connected and by which it is supported, and bearings for the sleeve in the case of the machine, of an oscillatory member $l$ mounted upon the said sleeve and provided with a segment-slot, and means associated with the said member and operating through the segment-slot thereof for moving the sleeve longitudinally and the carrier and saw laterally.

14. In a metal-sawing machine, the combination with the saw, a carrier upon which the saw is revolubly mounted, a sleeve to which the carrier is connected and by which it is supported and bearings for the sleeve in the case of the machine, of a half-gear or wheel $l$ mounted upon the said sleeve and provided with a segment-slot for about half of the circumference of the gear, means associated with the said gear and operating through the segment-slot thereof for moving the gear, the sleeve, the carrier and saw longitudinally, and other devices meshing and coacting with the said half-gear for turning the gear and the sleeve and raising and lowering the saw and its carrier.

15. In a metal-sawing machine, the combination with the saw, a carrier upon which the saw is revolubly mounted, a sleeve to which the carrier is connected and by which it is supported, and bearings for the sleeve in the case of the machine, of an oscillatory member $l$ mounted upon the said sleeve and provided with a segment-slot, a nut in the segment-slot of said member, face-plates upon opposite sides of said member, and means for securing the same and said nut in a unitary relation, a threaded arbor in bearings in the case of the machine and passing operatively through the said nut and freely through the face-plates, a worm-wheel near one end of said arbor, a worm meshing therewith and a shaft upon which said worm is mounted, and a handle for turning the shaft and worm and operating the worm-wheel and the arbor for moving the member $l$ and its sleeve longitudinally in the bearings of the case.

16. In a metal-sawing machine, the combination with the saw, a carrier upon which the saw is revolubly mounted, a sleeve to which the carrier is connected and by which it is supported, and bearings for the sleeve in the case of the machine, of a half-gear or wheel $l$ mounted upon the said sleeve, a shaft $m$ extending across in the bearings in the case of the machine, a broad-faced pinion $m'$ on said shaft meshing with the teeth of the half-gear $l$, a gear-wheel 30 also on said shaft, a swinging frame $n'$, a shaft therefor in bearings in the case of the machine, means for swinging said frame, a train of gears and shafts and arbors therefor carried by said frame, gears 28 and 29 on said arbors adapted respectively to be brought into mesh with the gear 30 as it may be desired to raise or lower the saw and its carrier, and means for imparting power and rotation to the shaft $n$.

17. In a metal-sawing machine, the combination with the saw, a carrier upon which the saw is revolubly mounted, a sleeve to which the carrier is connected and by which it is supported and bearings for the sleeve in the case of the machine, of a half-gear or wheel $l$ mounted upon said sleeve, a shaft $m$ extending across in bearings in the case of the machine, a broad-faced pinion $m'$ on said shaft meshing with the teeth of the half-gear $l$, a gear-wheel 30 also on said shaft, a swinging frame $n'$, a shaft therefor in bearings in the case of the machine, means for swinging said frame, a train of gears and shafts and arbors therefor carried by said frame, gears 28 and 29 on said arbors adapted respectively to be brought into mesh with the gear 30 as it may be desired to raise or lower the saw and its carrier, a sprocket on the shaft $n$, connected shafts $d$, and $d'$ and a sprocket on the shaft $d'$ and a chain extending over and between the respective sockets for imparting rotation and power to the shaft $n$.

18. In a metal-sawing machine, the combination with the saw, a carrier upon which the saw is revolubly mounted, a sleeve to which the carrier is connected and by which it is supported and bearings for the sleeve in the case of the machine, of a gear $l$ mounted upon said sleeve, a shaft $m$ in bearings in the case of the machine and means for rotating the shaft, a gear $m'$ mounted on said shaft and meshing with the teeth of the gear $l$, the end of said shaft being prolonged beyond one side of the casing, a collar loosely mounted upon the end of the shaft $m$ but adapted to be fixed in relation thereto, a chain, one end of which is connected to said collar, a shaft 44 passing through the casing of the machine, a crank-arm on an end of said shaft outside of the casing and to which the other end of said chain is connected, a crank-arm also on said shaft and projecting through one end of the casing, and a pin on the end of said crank-arm, means for holding the saw and its carrier when in a semi-elevated position, and which means are acted upon by the operation of said crank-arm for the release of the saw and its carrier whereby the same are permitted to return to an initial position.

19. In a metal-sawing machine, the combination with the saw, a carrier upon which the saw is revolubly mounted, a sleeve to which the carrier is connected and by which it is supported and bearings for the sleeve in the case of the machine, of a half-gear or wheel $l$ mounted upon the said sleeve, a shaft $m$ in bearings in the casing of the machine, a gear $m'$ upon said shaft meshing with the teeth of the half-gear $l$, a worm-wheel $u$ also mounted upon the shaft $m$, a worm $u'$ meshing with the worm-wheel $u$, a sleeve on which said worm is mounted, a shaft on which the said sleeve is mounted, a worm-wheel loose on said shaft, a disk on said sleeve adapted to frictionally engage the face of said worm-wheel, a shaft $d'$, a worm $d^2$ thereon meshing with the aforesaid worm-wheel, and means for applying power and rotation to said parts to turn the sleeve and the carrier and feed the saw progressively to its work.

20. In a metal-sawing machine, the combination with the half-gear $l$, the saw and intermediate devices connected to and actuated by the half-gear, of a shaft $m$, a pinion $m'$, a worm-wheel $u$, a worm $u'$, a sleeve upon which the said worm is mounted, a shaft $t$ passing through the sleeve, bearings for the shaft, a friction-disk $t^2$ on the opposite end of the sleeve to which the worm $u'$ is connected, a worm-wheel $v$ loose on the shaft and having a recess adapted to receive the friction-disk $t^2$, means for imparting rotation and power to the worm-wheel $v$, a collar 41 on the shaft, a helical spring between the collar and the end of the sleeve adapted to yield under excessive load to separate the surface of the friction-disk from the juxtaposed surface of the worm-wheel $v$, substantially as set forth.

21. In a metal-sawing machine, the combination with the half-gear $l$, the saw and intermediate devices connected to and actuated by the half-gear, of a shaft $m$, a pinion $m'$, a worm-wheel $u$, a worm $u'$, a sleeve upon which the said worm is mounted, a shaft $t$ passing through the sleeve, bearings for the shaft at its respective ends, and means for pivotally mounting one of said bearings to the case of the machine, the other bearing being longitudinally movable on the shaft, a rocker-arm $s$ and a pivot-shaft therefor, the lower end of said rocker-arm being pivotally mounted to the said movable bearing, a pin on said movable bearing, and means for engaging the pin, and other means connected to the opposite end of said rocker-arm for maintaining the same temporarily in a fixed position.

22. In a metal-sawing machine, the combination with the half-gear $l$, the saw and intermediate devices connected to and actuated by the half-gear, of a shaft $m$, a pinion $m'$, a worm-wheel $u$, a worm $u'$, a sleeve upon which the said worm is mounted, a shaft $t$ passing through the sleeve, bearings for the shaft at its respective ends, and means for pivotally mounting one of said bearings to the case of the machine, the other bearing being longitudinally movable of the shaft, a rocker-arm s and a pivot-shaft therefor, the lower end of said rocker-arm being pivotally mounted to the said movable bearing, a pin on said movable bearing, means having an aperture adapted to receive the pin 33 and so to fix the position of the aforesaid shaft t, a bell-crank handle pivotally connected to the upper end of the rocker-arm so that a portion thereof is adapted to bear against the outer surface of the case of the machine, there being an aperture in the end of the case for the rocker-arm and also an aperture to receive a part of the bell-crank handle.

23. In a metal-sawing machine, the combination with the half-gear l, the saw and intermediate devices connected to and actuated by the half-gear, of a shaft m, a pinion m', a worm-wheel u, a worm u', a sleeve upon which the said worm is mounted, a shaft t passing through the sleeve, bearings for the shaft at its respective ends and means for pivotally mounting one of said bearings to the case of the machine, the other bearing being longitudinally movable of the shaft, a rocker-arm s and a pivot-shaft therefor, the lower end of said rocker-arm being pivotally mounted to the said movable bearing, a pin on said movable bearing, means having an aperture adapted to receive the pin 33, and so to fix the position of the aforesaid shaft t, a bell-crank handle pivotally connected to the upper end of the rocker-arm so that a portion thereof is adapted to bear against the outer surface of the case of the machine, there being an aperture in the end of the case for the rocker-arm and also an aperture to receive a part of the bell-crank handle, and means acting automatically at the end of the work and against the said bell-crank handle for disengaging its bearing against the case of the machine for the release of the rocker-arm, substantially as set forth.

24. In a metal-sawing machine, the combination with the saw, a carrier upon which the saw is revolubly mounted, a sleeve to which the carrier is connected and by which it is supported and bearings for the sleeve in the case of the machine, of a half-gear or wheel l mounted upon the said sleeve, a shaft m, a pinion m' thereon meshing with the teeth of the half-gear l, a gear-wheel 30 also upon the shaft m, a shaft n, a swinging U-shaped frame n' connected thereto, a handle for moving said frame, arbors r, r' mounted in said frame, a pinion on the shaft n, a gear and a pinion on the arbor r, a gear on the arbor r' meshing with the pinion of the arbor r, and said parts forming a train of gearing, gears 28, 29 on the arbors r, r' adapted respectively to be brought into mesh with the gear 30 on the shaft m, and means for communicating rotation and power to the shaft n and the several gears, substantially as set forth.

25. In a metal-sawing machine, the combination with the rotary saw, devices for supporting the saw and to which a swinging movement may be given, of a swinging shaft, a pivoted lever for moving the same, a gear on said shaft and other gears meshing therewith and extending to the swinging device supporting the saw, and together forming separable devices for progressively feeding the saw during the period of work.

Signed by me this 17th day of February, 1904.

CHAS. A. JUENGST.

Witnesses:
GEO. T. PINCKNEY,
S. T. HAVILAND.